(12) United States Patent
Hoekstra

(10) Patent No.: US 9,134,443 B2
(45) Date of Patent: Sep. 15, 2015

(54) SEGMENT IDENTIFICATION AND CLASSIFICATION USING HORIZON STRUCTURE

(75) Inventor: Edo Hoekstra, Hafrsfjord (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 1290 days.

(21) Appl. No.: 12/964,961

(22) Filed: Dec. 10, 2010

(65) Prior Publication Data
US 2011/0307178 A1 Dec. 15, 2011

Related U.S. Application Data (60) Provisional application No. 61/334,777, filed on May 14, 2010.

(51) Int. Cl.
*G01V 1/28* (2006.01)

(52) U.S. Cl.
CPC ........................................ *G01V 1/28* (2013.01)

(58) Field of Classification Search
CPC ........... G01V 1/28; G01V 1/282; G01V 1/30; G01V 1/301; G01V 1/306; G01V 2210/00; G01V 2210/60
USPC .................. 702/5, 14, 16, 18; 367/68, 70, 72
See application file for complete search history.

(56) References Cited

U.S. PATENT DOCUMENTS

| | | | |
|---|---|---|---|
| 5,999,885 A | 12/1999 | Van Bemmel et al. | |
| 6,249,746 B1* | 6/2001 | Neff et al. | 702/16 |
| 2010/0214870 A1* | 8/2010 | Pepper et al. | 367/72 |

* cited by examiner

*Primary Examiner* — Manuel L Barbee
(74) *Attorney, Agent, or Firm* — Colin L. Wier; Rodney Warfford (57) ABSTRACT

One or more computer-readable media including computer-executable instructions to instruct a computing system to perform geometrical calculations using seismic horizon data; and define horizon segments based on the geometrical calculations where each defined horizon segment includes points and where each point has a corresponding probability of that point belonging to a defined horizon segment. Various other apparatuses, systems, methods, etc., are also disclosed.

22 Claims, 10 Drawing Sheets

SEGMENT IDENTIFICATION AND CLASSIFICATION USING HORIZON STRUCTURE

RELATED APPLICATIONS

This application claims the benefit of U.S. Provisional Application having Ser. No.: 61/334,777 entitled "Segment Identification and Classification using Horizon Structure," filed May 14, 2010, which is incorporated by reference herein.

BACKGROUND

Seismic interpretation is a process that examines seismic data (e.g., location and time or depth) in an effort to identify subsurface structures such as horizons and faults. Once various structures in a geologic environment have been identified, a model of the geologic environment can be constructed that accounts for these structures. Structures may be, for example, faulted stratigraphic formations indicative of hydrocarbon traps or flow channels. In the field of resource extraction, enhancements to seismic interpretation can allow for construction of a more accurate model, which, in turn, improves seismic volume analysis for purposes of resource extraction. As described herein, various techniques pertain to seismic interpretation for identifying structures in a geologic environment.

SUMMARY

One or more computer-readable media including computer-executable instructions to instruct a computing system to perform geometrical calculations using seismic horizon data; and define horizon segments based on the geometrical calculations where each defined horizon segment includes points and where each point has a corresponding probability of that point belonging to a defined horizon segment. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Various techniques described herein pertain to seismic interpretation. As an example, consider a seismic interpretation technique that includes performing geometrical calculations using seismic horizon data and defining horizon segments based on the geometrical calculations where each defined horizon segment includes points where each point has a corresponding probability of that point belonging to a defined horizon segment.

Various techniques described herein may optionally be implemented in conjunction with one or more conventional seismic interpretation techniques. For example, consider a conventional seismic horizon interpretation technique to aid in a fault-cut interpretation that includes identifying gaps from the seismic time (or depth) structures, determining midpoints for the gaps and defining fault-cuts at midpoints. Such a technique is described in U.S. Pat. No. 5,999,885, assigned to Schlumberger Technology Corporation, which is incorporated by reference herein. Seismic interpretation often occurs manually, for example, where an expert reviews one or more views of seismic data (e.g., rendered with respect to topography) and manually identifies fault boundaries (or fault center lines) from the seismic time structure. Such manual techniques are at times aided by rendering to a display one or more conventional geometric attributes like local dip angle or values extracted from seismic attribute fault-identification volumes like variance, or ant-tracking.

As described herein, various techniques for horizon and fault cut and/or fault boundary interpretation can include building a structural map, a geological model or both a map and a model where the building takes into account a fault network and one or more key seismic horizons. Once such a map, a geological model or a map and a geological model is built, a technique may be implemented that defines geometrical shapes of fault blocks.

In various examples, a method can include receiving seismic horizon interpretation data as input for defining geometrical shapes of fault blocks. Such a method may provide for defining the geometrical shapes at the horizon level in a manner that does not necessarily require building a geological model or structural map. Additional interpretation data like fault boundaries (or fault center lines) or fault-cuts can optionally be introduced in such a process.

Figure 1:
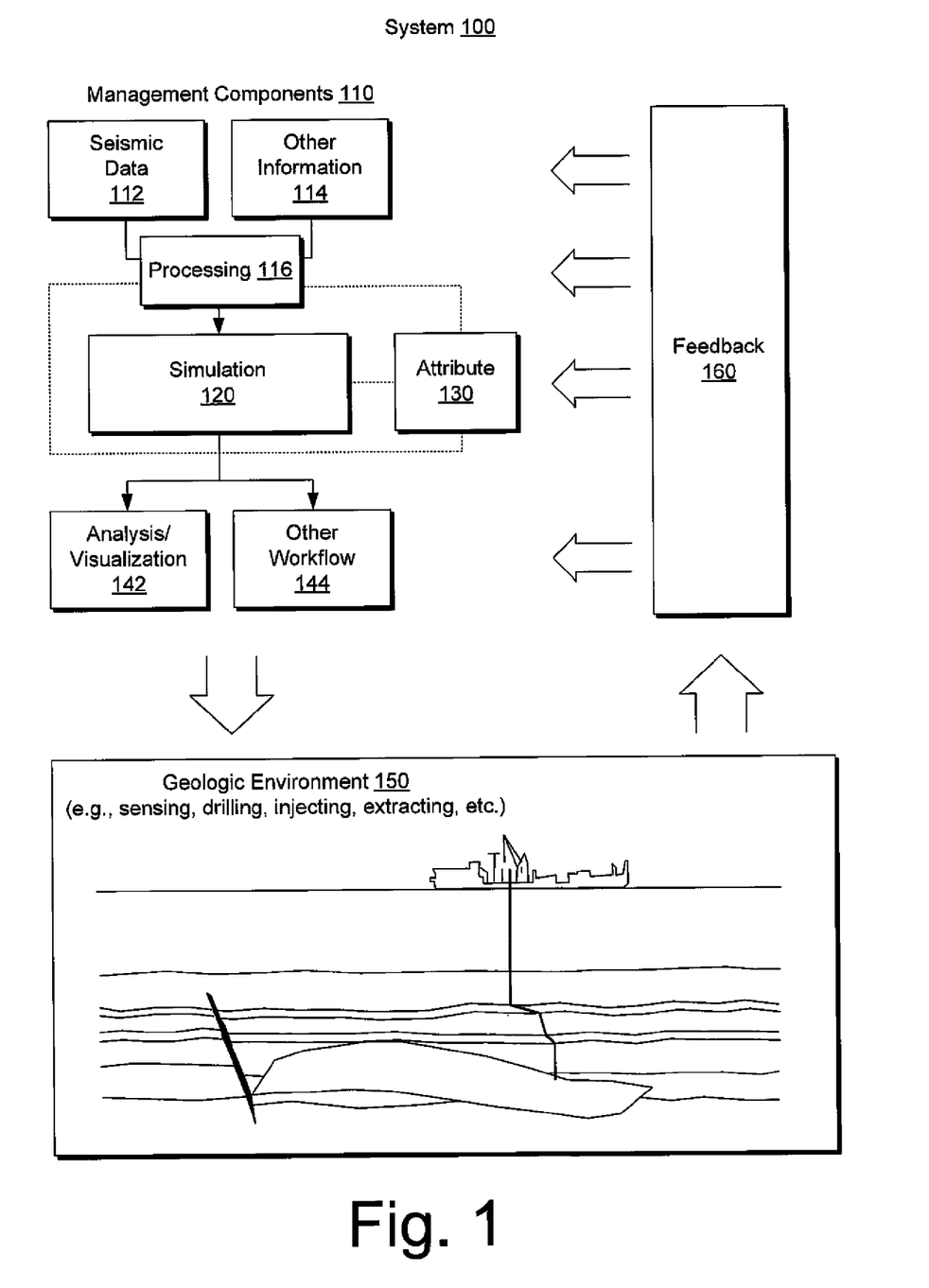
FIG. 1 illustrates an example system that includes various components for simulating a geologic environment.

FIG. 1 shows an example of a system 100 that includes various management components 110 to manage various aspects of a geologic environment 150. For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an information component 114, a processing component 116, a simulation component 120, an attribute component 130, an analysis/visualization component 142 and a workflow component 144. In operation, seismic data and other information provided per the components 112 and 114 may be input to the simulation component 120, optionally after processing via the processing component 116, which may be configured to implement a segment definition algorithm for processing seismic data (e.g., to define fault blocks). As indicated in the example of FIG. 1, the processing component 116 may operate cooperatively with the attribute component 130. For example, the processing component 116 may determine one or more attributes, may rely on one or more attributes, or determine one or more attributes and rely on one or more attributes. As to determining attributes, the processing component 116 may be configured to determine a segment classification attribute and optionally a classification probability attribute.

The simulation component 120 may process information to conform to one or more attributes, for example, as specified by the attribute component 130, which may be a library of attributes. Such processing may occur prior to input to the simulation component 120 (e.g., per the processing component 116). Alternatively, or in addition to, the simulation component 120 may perform operations on input information based on one or more attributes specified by the attribute component 130. As described herein, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. Additionally, or alternatively, output from the simulation component 120 may be input to one or more other workflows, as indicated by a workflow component 144.

In the example of FIG. 1, the analysis/visualization component 142 may be implemented for interaction with information from the processing component 116, the attribute component 130 or the processing component 116 and the attribute component 130 (e.g., optionally without use of the simulation component 120). For example, information may be provided to the component 142 during processing by the processing component 116. Such information may be attribute information where the analysis/visualization component 142 allows for user interaction (e.g., to assist with defining segments). Also shown in FIG. 1, information from the components 116 or 130 may be directed to the workflow component 144. For example, the processing component 116 may indicate that seismic data is insufficient in a particular region of a geologic environment. This indication may be directed to the workflow component 144 to cause sensing of seismic data for that region such that feedback 160 provides sensed seismic data to the processing component 116.

As described herein, the management components 110 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes.

As described herein, the management components 110 may include features for geology and geological modeling to generate high-resolution geological models of reservoir structure and stratigraphy (e.g., classification and estimation, facies modeling, well correlation, surface imaging, structural and fault analysis, well path design, data analysis, fracture modeling, workflow editing, uncertainty and optimization modeling, petrophysical modeling, etc.). Particular features may allow for performance of rapid 2D and 3D seismic interpretation, optionally for integration with geological and engineering tools (e.g., classification and estimation, well path design, seismic interpretation, seismic attribute analysis, seismic sampling, seismic volume rendering, geobody extraction, domain conversion, etc.). As to reservoir engineering, for a generated model, one or more features may allow for simulation workflow to perform streamline simulation, reduce uncertainty and assist in future well planning (e.g., uncertainty analysis and optimization workflow, well path design, advanced gridding and upscaling, history match analysis, etc.). The management components 110 may include features for drilling workflows including well path design, drilling visualization, and real-time model updates (e.g., via real-time data links).

As described herein, various aspects of the management components 110 may be add-ons or plug-ins that operate according to specifications of a framework environment. For example, a commercially available framework environment marketed as the OCEAN® framework environment (Schlumberger Limited) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. As described herein, various components may be implemented as add-ons (or plug-ins) that conform to and operate according to specifications of a framework environment (e.g., according to application programming interface (API) specifications, etc.). Various technologies described herein may be optionally implemented as components in an attribute library.

Various attributes exist to facilitate analysis of geologic environments. An attribute is typically calculated, directly or indirectly, from information about a geological environment. When mapped, an attribute can help uncover various features such as faults, fractures, etc. As described herein, various techniques allow for calculation of attributes such as a segment classification attribute and a classification probability attribute, which may be used for defining one or more segments.

In the field of seismic analysis, aspects of a geologic environment may be defined as attributes. In general, seismic attributes help to condition conventional amplitude seismic data for improved structural interpretation tasks, such as determining the exact location of lithological terminations and helping isolate hidden seismic stratigraphic features of a geologic environment. Attribute analysis can be quite helpful to defining a trap in exploration or delineating and characterizing a reservoir at the appraisal and development phase. An attribute generation process (e.g., in the PETREL® framework or other framework) may rely on a library of various seismic attributes (e.g., for display and use with seismic interpretation and reservoir characterization workflows). At times, a need or desire may exist for generation of attributes on the fly for rapid analysis. At other times, attribute generation may occur as a background process (e.g., a lower priority thread in a multithreaded computing environment), which can allow for one or more foreground processes (e.g., to enable a user to continue using various components).

Attributes can help extract the maximum amount of value from seismic and other data, for example, by providing more detail on subtle lithological variations of a geologic environment (e.g., an environment that includes one or more reservoirs). Particular attributes that rely, at least in part on curvature, are referred to as curvature attributes. Curvature attributes can be used to highlight, for example, stratigraphic features in sedimentary geologic environments, karst features or structural discontinuities. As mentioned, existing, conventional approaches for detection of faults, fractures, etc., sometimes include analysis of attributes based on local dip angle for the surface or attributes based on local azimuth angle for the surface.

Figure 2:
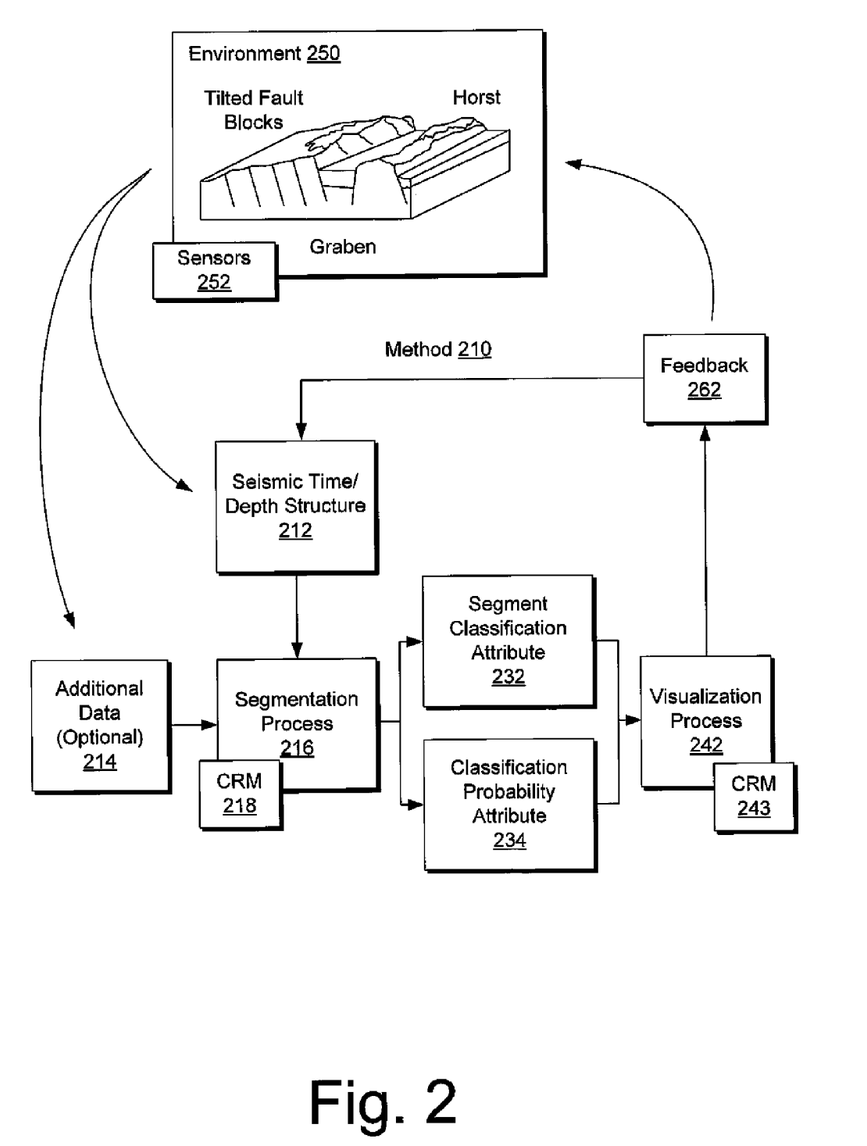
FIG. 2 illustrates an example of a method that includes a segmentation process that can provide one or more attributes to a visualization process.

FIG. 2 shows an example of a method 210 for defining segments based at least in part on seismic data. The method 210 includes a seismic data block 212 for providing data to a segmentation process block 216 and an optional data block 214 for providing additional data to the segmentation process block 216. In FIG. 2, the segmentation process block 216 is configured to generate one or more attributes based at least in part on seismic data, for example, the block 216 may generate a segment classification attribute 232 and a classification probability attribute 234. According to the method 210, one or more attributes generated by the segmentation process block 216 may be received as input by a visualization process block 242. The visualization process block 242 may structure attribute data for rendering to a display, outputting to a printer, etc. For example, the block 242 may structure attribute data with respect a color scheme or other visual scheme to distinguish defined segments. As described herein, the block 242 may associate attribute data with topographical information for analysis, rendering, printing, etc.

In the example of FIG. 2, output from the visualization process block 242 may be considered feedback, as represented by a feedback block 262. Feedback per the feedback block 262 may be in any of a variety of forms. For example, the feedback block 262 may be configured to output information suitable for communication to a field engineer. As mentioned, such information may be a call for acquisition of additional seismic data or optionally other information about a geologic environment 250. As shown in the example of FIG. 2, output from the feedback block 262 may be communicated to one or more sensors 252 configured to sense information about the geological environment 250. Such communication may occur via a network (e.g., wired, wireless or wired and wireless). In turn, information acquired responsive to feedback may be input to the method 210. Accordingly, the segmentation process block 216 may act to iteratively refine one or more attributes associated with segment definition. As described herein, a segmentation process may be configured to allow for interactive processing, batch processing or both interactive and batch processing.

In the example of FIG. 2, the data block 214 may include data such as data pertaining to fault-cuts, fault boundaries, fault centerlines, seismic attributes, etc. In general, the data block 214 may provide any type of data that may assist the segmentation process 216 and defining segments of the geologic environment 250. While features such as a tilted fault block, a graben and a horst are shown in FIG. 2, a geologic environment may include any of a variety of features.

The method 210 is shown in FIG. 2 in association with various computer-readable media blocks 218 and 243. Such blocks generally include instructions suitable for execution by one or more processors (or cores) to instruct a computing device to perform one or more actions. While various blocks are shown, a single medium may be configured with instructions to allow for, at least in part, performance of various actions of the method 210.

As described herein, a method can include inputting seismic data as seismic time (or depth) structure (e.g., sometimes referred to as a "seismic horizon"). From a seismic horizon, one or more geometrical calculations may be performed that aim to create segments of the horizon, indicating, for example, areas of fault blocks, graben, horsts, etc. In addition to such classification of data, a probability may given be for each point at the seismic horizon, indicating the probability of a point belonging to a specific segment.

As mentioned, one or more additional data types can be used together with a seismic horizon to aid in a process of segmenting and classifying the horizon. For example, consider fault center lines, fault boundaries, fault cuts, horizon attributes extracted from seismic data, manual segmentation and classification, etc.

As described herein, a segmentation process may deliver a lateral segmentation of a seismic horizon, optionally without a need to build a geological model or structural map. As described herein, a segmentation process may provide for segmentation of seismic time/depth structure interpreted on 2D seismic data; segmentation of seismic time/depth structure interpreted on 3D seismic data; segmentation using multiple seismic datasets (4D, AVO, etc.); segmentation while performing seismic horizon tracking activities; segmentation while editing the seismic horizon; or segmentation while interpreting additional data like fault center lines, fault boundaries or fault cuts.

A segmentation process may provide for improved understanding of geological structures along a seismic horizon (e.g., optionally without a need to build a geological model); increased quality of a seismic tracker as the segmentation can provide a means for quality control of a seismic tracker result; guiding a seismic interpretation process based on, for example, segment classification.

Figure 3:
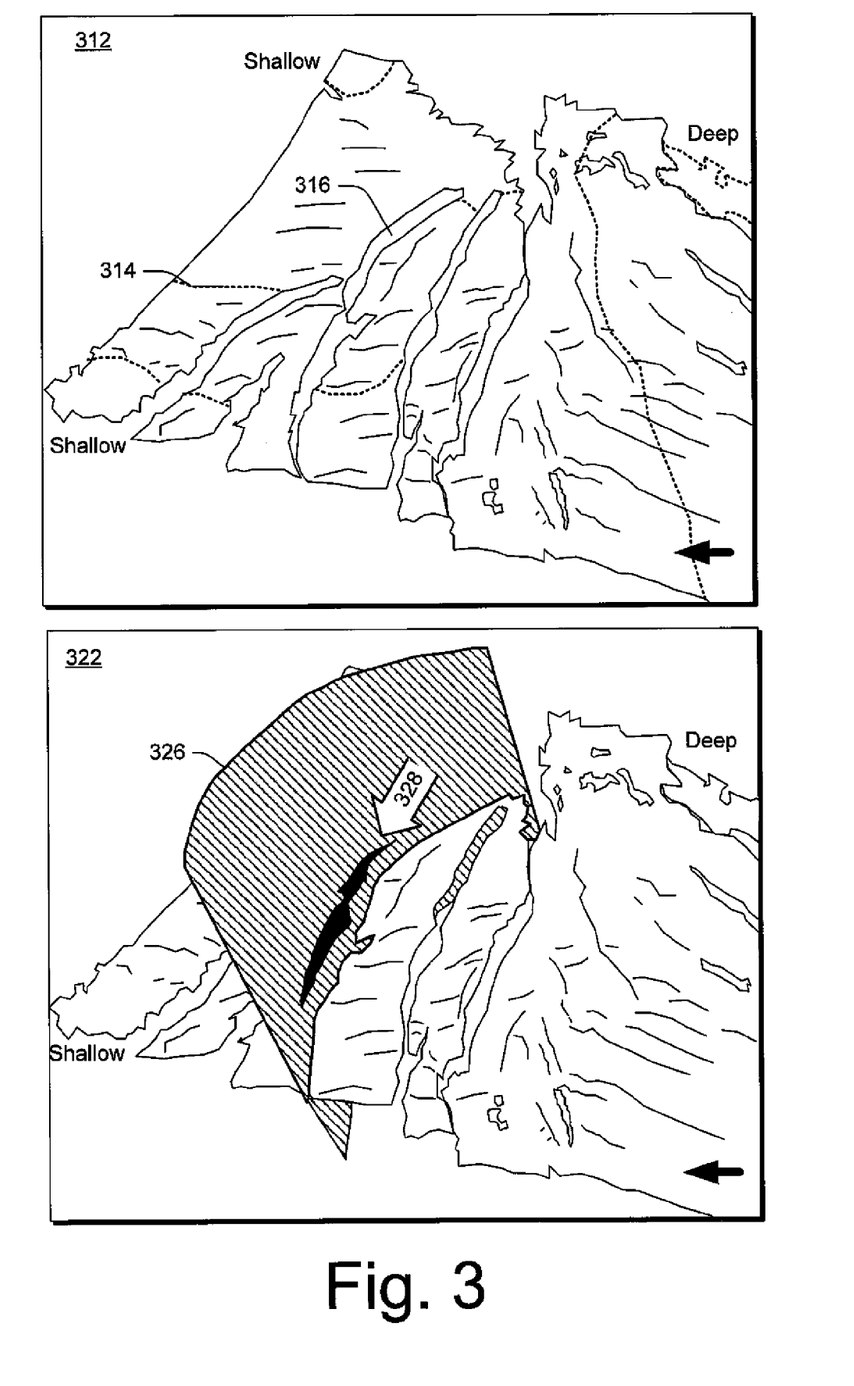
FIG. 3 illustrates an example of an error that can occur during seismic interpretation.

As described herein, a segmentation process can reduce occurrence of errors commonly associated with seismic interpretation. FIG. 3 shows an example of an error that may occur during seismic interpretation. A graphic 312 shows a conventional horizon interpretation based on seismic data for a geologic environment. In the graphic 312, contour lines are shown to indicate depth. In practice, colors may be displayed where, for example, red corresponds to shallow areas and blue corresponds to deep area. In the graphic 312, various gaps are shown in the horizon with a particular gap labeled 316. A conventional technique may manually place faults in the gaps. For example, a user may place a fault in the gap 316. Another graphic 322 shows a fault 326 that was placed in the gap 316, for example, using a manual identification technique for locating faults based on visual inspection of gaps. In the graphic 322, an arrow points to an error. Specifically, a portion 328 of a horizon is on the incorrect side of the fault 326 because, when the interpreter interpreted the fault 326, the actual fault was not exactly at the place where the gap 316 existed in the horizon.

Such an error causes issues when creating a consistent model from the horizon and the fault. To correct this error, tedious manual editing may be used to remove horizon points. For example, a user may remove horizon points a distance away from the fault (e.g., remove points on both sides of the fault within a gap zone of 100 m).

As described herein, by appropriately defining segments, such an error can be avoided as an analysis system knows that such points actually belong to the other side. By appropriately defining segments, error correction is reduced (e.g., the error type shown in FIG. 3 may be avoided such that a user does not need to manually "clean" data). Further, should any such error occur, a user may simply check to ensure that any apparently wrong side of a fault points are defined as being part of segment that contributes to the other side for purposes of a horizon modeling process. In other words, where a goal is to construct an accurate model, the association of the points with an appropriate segment can guide the modeling process. Such a segment definition approach can help prepare for a modeling process. In a modeling process, inconsistencies in location of a fault and points is a classic problem (e.g., wrong side points) that can be addressed by implementing segment definition prior to the modeling process (e.g., points associated with a defined segment or block).

As described herein, where points belong to a defined segment, an algorithm may be implemented that prevents such points from spilling over a fault. While horizons are mentioned, as described herein, various techniques can be applied to surfaces, structures, etc., other than horizons.

Figure 4:
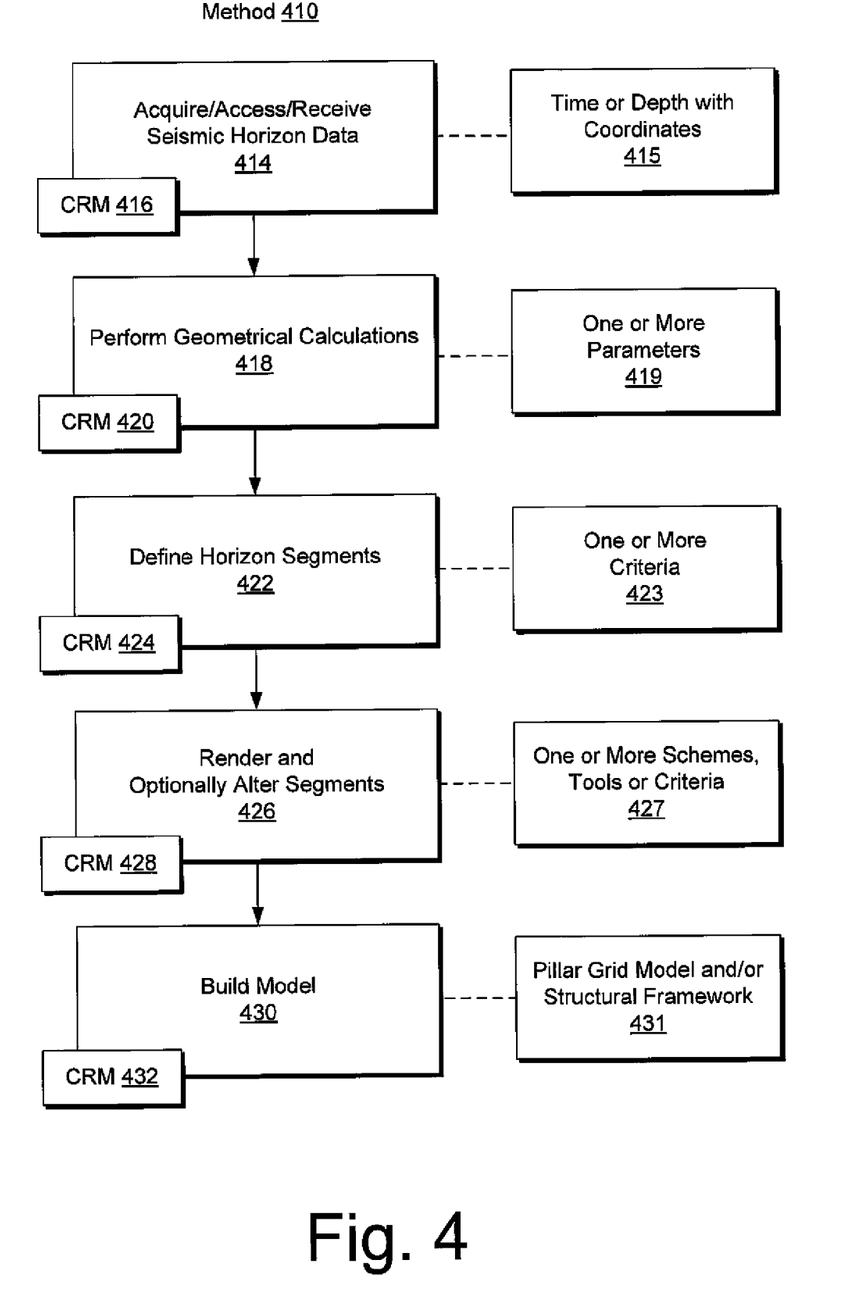
FIG. 4 illustrates an example of a method for defining horizon segments.

FIG. 4 shows an example of a method 410 that includes a data block 414, a performance block 418, a definition block 422, a render block 426 and a build block 430. The data block 414 may provide for acquiring, accessing or receiving seismic horizon data, which may be in the form of time or depth with coordinates, as indicated by a data structure block 415. The performance block 418 may provide for performing geometrical calculations, for example, according to one or more parameters, as indicated by a parameter block 419. The definition block 422 may provide for defining segments, for example, based on one or more criteria, as indicated by a criteria block 423. The render block 426 may provide for rendering, analyzing and optionally altering segments, for example, using one or more schemes, tools or criteria, as indicated by the scheme, tool and criteria block 427. The build block 430 may provide for building a model, for example, a pillar grid model, as indicated by the pillar grid model and/or structural framework block 431.

As to the one or more parameters 419, these may be predefined, user defined or determined based at least in part by an analysis of the seismic data. In a particular example, a distance parameter is used in performing geometrical calculations. In such an example, the geometrical calculations can determine whether points are isolated from other points or connected to other points. A distance parameter may be a physical distance of a certain number of meters where geometrical calculations associate points as being connected based on whether each of the points lies within the physical distance of another point. In turn, an isolated point is not associated with a particular group of connected points because it does not lie within the physical distance of any of the points in the particular group. However, the isolated point may be part of a different group of connected points. Accordingly, in such an approach, isolated and connected points may be defined as a segment.

Where a distance parameter is used, it may be assigned a value by a user followed by a segmentation process that relies on that value. A user may inspect out (e.g., visually) and then decide whether to adjust the value. A predefined value may be used, which may optionally be adjustable by a user (e.g., initially or after an iteration). An automatic process may analyze seismic data and determine, for example, an average distance between neighboring points. In such an approach, the average distance may be implemented for an initial iteration for segmentation process. As described herein, parameters may include one parameter for connection (e.g., connectedness) and another parameter for isolation. In such an approach, the values may be the same or differ. Updates to one or more parameters may occur in an iterative manner (e.g., automatically, based on user input, etc.), to achieve appropriately defined segments.

As described herein, one or more parameters or criteria may pertain to probability. For example, a confidence level may be provided as a parameter value such that points below the confidence level in relationship to a group of points are assigned a color value and points at or above the confidence level are assigned a different color value. Accordingly, a defined segment may be displayed using the two colors to show which points are higher confidence members of that segment and which points are lower confidence members of that segment. The foregoing example may rely on assigning one or more measures other than color or in addition to color. For example, a measure may rely on a technique that displays intensity or lightness (e.g., consider a scheme where high confidence points are shown in a bright red color and where lower confidence points are show in a dark or blackish red color). Techniques may optionally rely on z-buffer, halftoning/screening, RGB (red, green, blue), CMYK (cyan, magenta, yellow and key), HSL (hue, saturation, luminosity), etc. As described herein, each point may be assigned a probability that it belongs to a particular defined segment. In some instances, a point may have more than one probability. For example, a point may have a probability of it belonging to one segment and another probability of it belonging to another segment. As explained below, various graphical or other tools may be provided for analyzing points, segments or points and segments.

As to the render block 426, a rendering process to render a representation of the defined segments to a display, a printer, etc., may include assigning each of the defined horizon segments a particular color selected from a multicolor scheme. While color is mentioned, other renderable features may be assigned whether static or active (e.g., hatching, shading, blinking, number, etc.). As mentioned, techniques may optionally rely on z-buffer, halftoning/screening, RGB (red, green, blue), CMYK (cyan, magenta, yellow and key), HSL (hue, saturation, luminosity), etc. The assignment may occur as part of a definition process, for example, as part of defining segments. A user with particular visual preferences (e.g., due to color blindness or other) may optionally select a color scheme or other scheme for rendering. As mentioned, seismic interpretation has been conventionally performed by visual analysis with manual interaction. As described herein, various techniques aim to enhance seismic interpretation. Such techniques may provide options that allow for tailoring display of information to promote an acceptable if not a superior user experience for those that perform seismic interpretation. Accordingly, various techniques may provide for display scheme flexibility.

The method 410 is shown in FIG. 4 in association with various computer-readable media blocks 416, 420, 424, 428 and 432. Such blocks generally include instructions suitable for execution by one or more processors (or cores) to instruct a computing device to perform one or more actions. While various blocks are shown, a single medium may be configured with instructions to allow for, at least in part, performance of various actions of the method 410.

As described herein, one or more computer-readable media can include computer-executable instructions to instruct a computing system to: perform geometrical calculations using seismic horizon data; and define horizon segments based on the geometrical calculations where each defined horizon segment includes points and where each point has a corresponding probability of that point belonging to a defined horizon segment.

As described herein, one or more computer-readable media may include computer-executable instructions to instruct a computing system to map defined horizon segments and optionally map at least some of probabilities. One or more computer-readable media may include computer-executable instructions to instruct a computing system to alter a probability for a point based on user input, alter a boundary of a defined horizon segment based on user input, etc.

As described herein, one or more computer-readable media may include computer-executable instructions to instruct a computing system to access seismic horizon data where the data includes seismic time data (or depth data). One or more computer-readable media may include computer-executable instructions to instruct a computing system to perform geometrical calculations based at least in part on a connection distance, to perform geometrical calculations based at least in part on geometric isolation, to calculate probabilities based at least in part on segment-to-segment connectivity, to calculate probabilities based at least in part on spillage (e.g., throw of a fault), etc.

As described herein, a method can include receiving seismic horizon data, performing geometrical calculations using the seismic horizon data, defining horizon segments based at least in part on the geometric calculations, and rendering the defined horizon segments where the rendering includes assigning each of the defined horizon segment a particular color selected from a multicolor scheme. In such a method, geometrical calculations can include determining distances between points. As described herein, a method may include defining horizon segments based on connectedness of points. A method may include determining attribute values for one or more attributes (e.g., a segment classification attribute, a classification probability attribute or other attribute).

Figure 5:
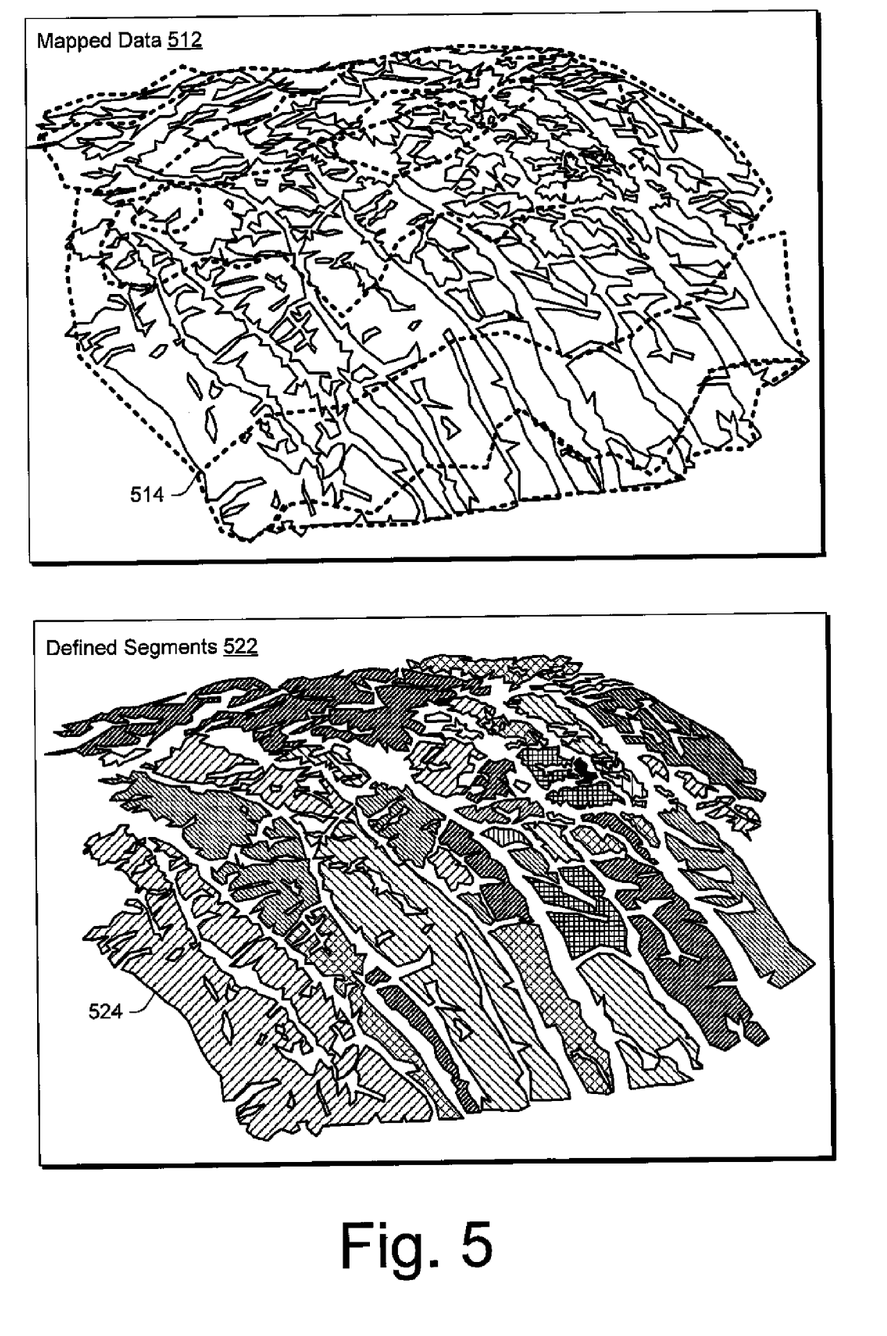
FIG. 5 illustrates an example of a graphical display of data for input to a segmentation process and a graphical display of data output from a segmentation process.

FIG. 5 shows an example, in graphical form, of input information to a segmentation process (mapped data 512) and output information from a segmentation process (defined segments 522). In the example of FIG. 5, the input information appears as the mapped data 512, which may be displayed using colors or contours 514. The output information appears as defined segments 522 where each segment 524 is displayed using a color, a shading, a hatching, a number, etc. to readily distinguish it from other segments. Such an approach may be akin to coloring countries on a map to avoid adjacent countries having the same color (e.g., four or five color theorem or other graph theory); noting that additional colors may be added to further increase the visual appearance of distinct segments.

Figure 6:
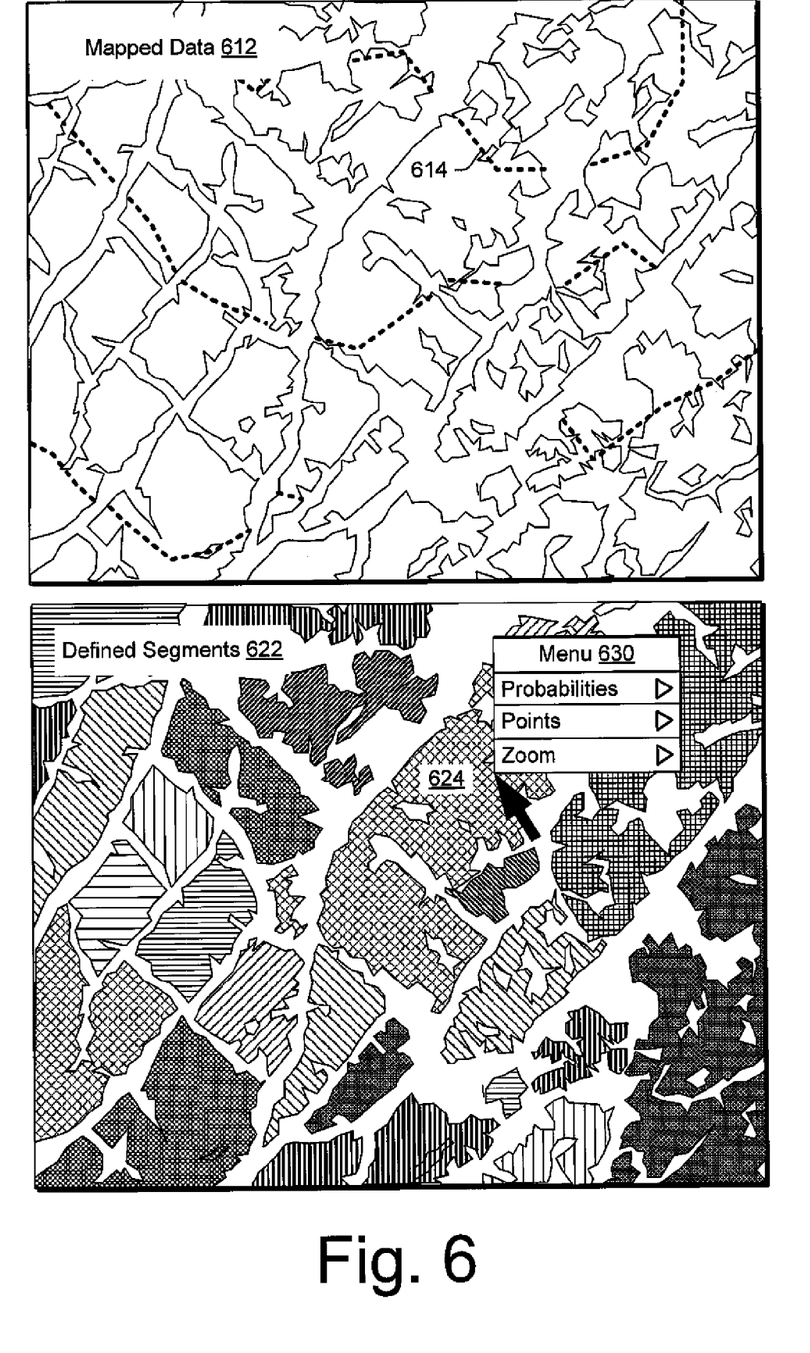
FIG. 6 illustrates an example of a graphical display of mapped data prior to segmentation and a graphical display of defined segments along with graphical controls.

FIG. 6 shows a graphic with a portion of mapped data 612 and a graphic with a corresponding portion of defined segments 622 for a geologic environment. The mapped data 612 includes contours 614 indicative of time or depth. The defined segments 622 include individual segments with hatching to distinguish separate, defined segments. As described herein, a graphical user interface may provide for analysis or examination of characteristics of a defined segment. For example, in FIG. 6, a defined segment 624 may be selected and a menu 630 rendered for display. In this example, the menu 630 includes menu items for probabilities, points and zooming. Given such the menu 630, a user may select one of the menu items as user input for instructing a system to render additional information to a display. A selection on probabilities may, for example, render distribution plot that shows a probability distribution for all of the points in the segment 624. A selection on points may, for example, render dots to a display to illustrate the individual points that make up the segment 624. A selection on zoom may, for example, allow a user to zoom in on the segment 624 for further investigation (e.g., to see particular points).

Figure 7:
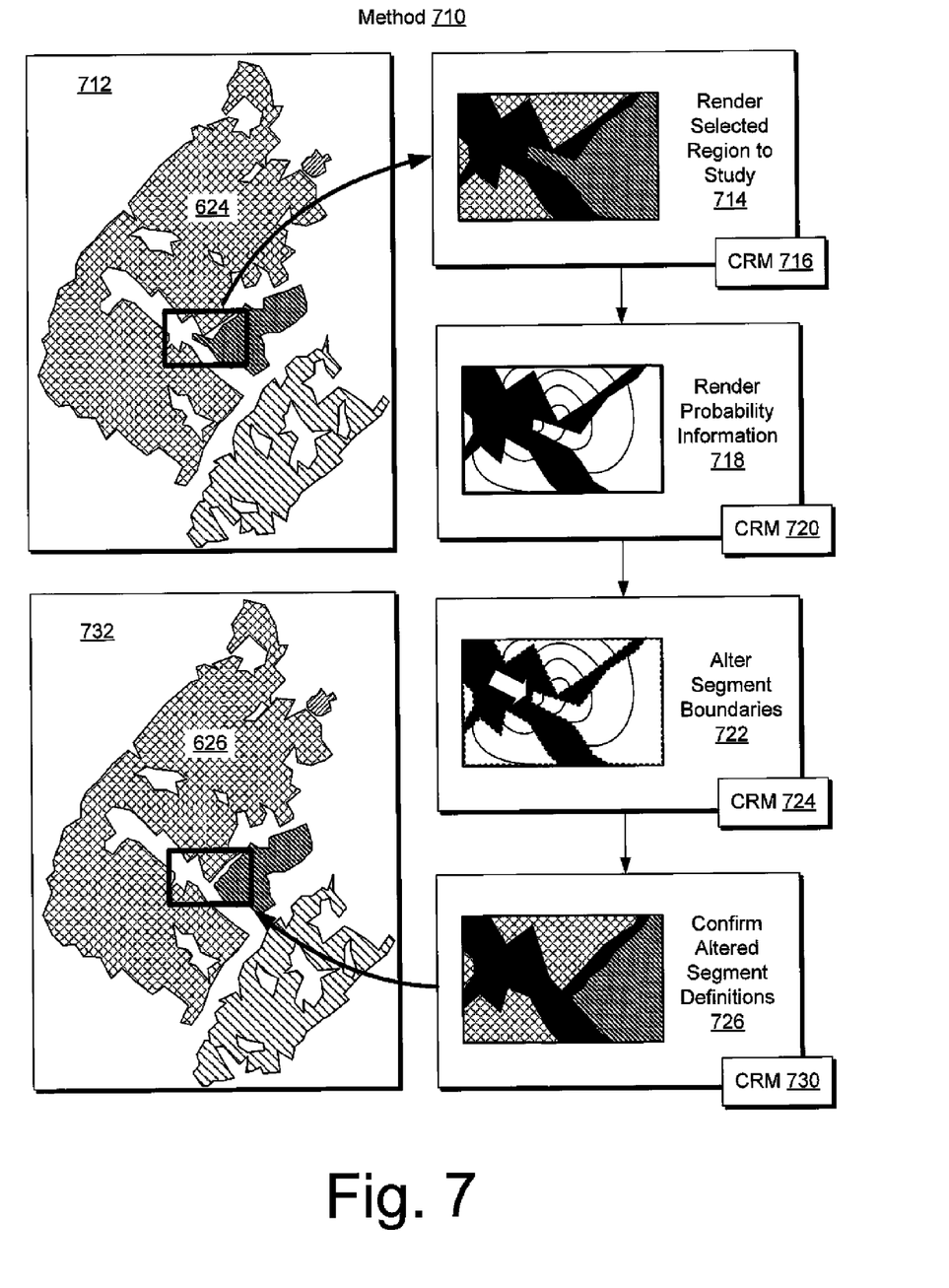
FIG. 7 illustrates an example of a method for altering one or more segment boundaries based at least in part on probability information.

FIG. 7 shows an example of a method 710 for altering one or more segments. The method 710 is shown with respect to a graphic 712 with three segments and a graphic 732 with two of the segments altered. The method 710 commences in a render block 714 that includes rendering a select a region to study. For example, a window may be rendered to a display and manipulated via user input to select a region of a geologic environment. In another render block 718, the method 710 includes rendering probability information to a display. In the example of FIG. 7, the information is rendered in the form of contours where points near an edge or boundary of a segment have perhaps lower probabilities of being members of that segment. In an alteration block 722, the method 710 allows for altering boundaries of one or more segments. For example, as shown in FIG. 7, the boundaries for the region of interest are displayed using dashed lines along with an arrow or other tool graphic that can be manipulated to manually adjust one or more of the boundaries based, for example, on examination of the probability information, shape of boundaries, etc. In a confirmation block 726, a user may confirm an altered boundary or boundaries. Prior to confirmation, probability calculations may be performed to update point probabilities. Display of updated probabilities may allow a user to decide whether one or more alterations should be confirmed.

As described herein, one or more computer-readable media may include computer-executable instructions to instruct a computing system to render defined segments to a display where the defined segments represent fault blocks of a geologic environment, render probability information to the display where the probability information corresponds to points associated with seismic data acquired from the geologic environment, and alter a boundary of a segment based at least in part on rendered probability information. One or more computer-readable media may include computer-executable instructions to instruct a computing system to render defined segments according to a multicolor scheme, to render probability information over a segment, etc. After alteration of a boundary or boundaries, one or more computer-readable media may include computer-executable instructions to instruct a computing system to confirm one or more altered boundaries. As explained herein, defined segments may assist with building of a model and, particularly, quality control. Accordingly, one or more computer-readable media may include computer-executable instructions to instruct a computing system to build a framework for modeling the geologic environment based at least in part on defined segments.

Figure 8:
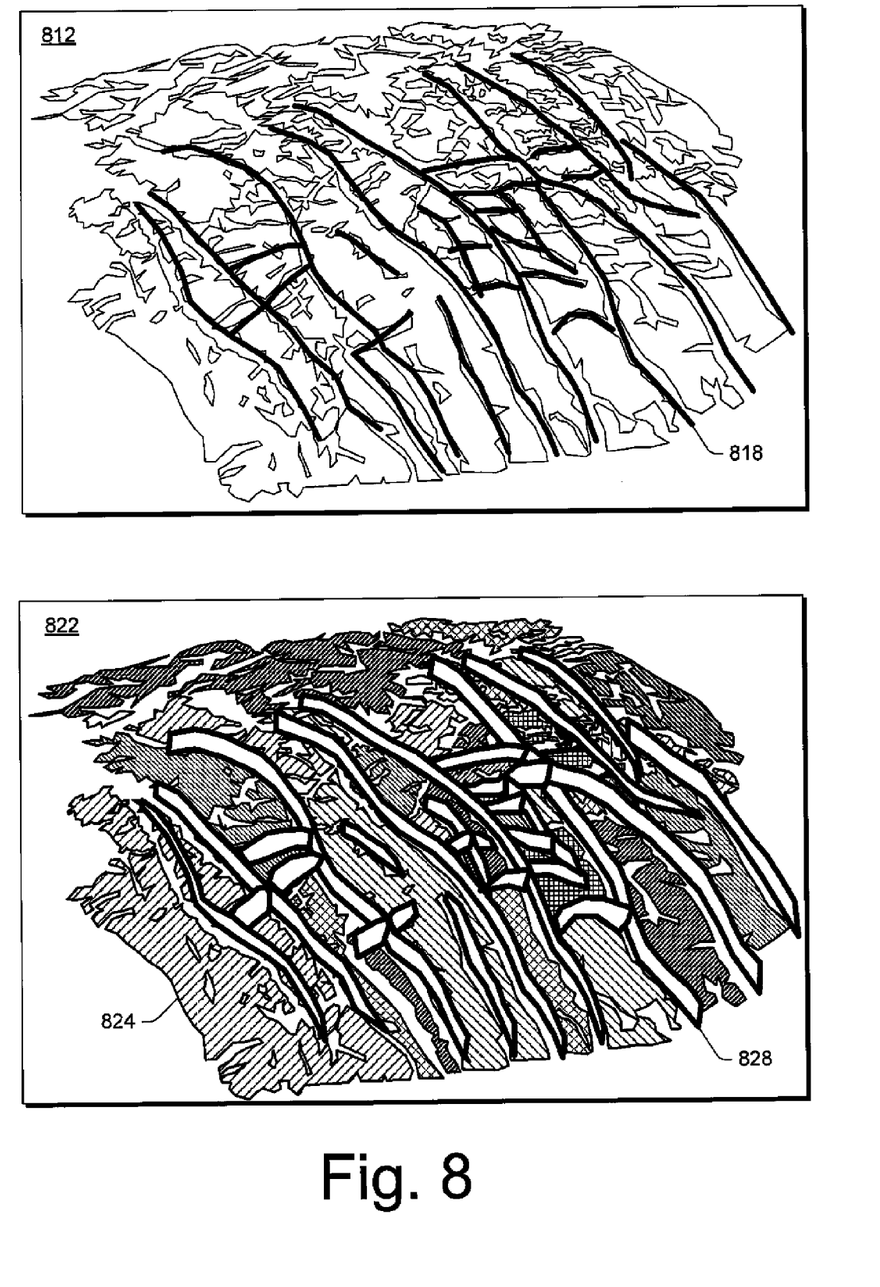
FIG. 8 illustrates an example of a graphical display of fault lines and an example of a graphical display of fault walls and defined segments.

FIG. 8 shows an example of a graphic 812 with fault center lines 818 and a graphic 822 with defined segments 824 and three-dimensional fault walls 828. As mentioned, a segmentation process may facilitate quality control and model building. Given defined segments, one or more techniques may be implemented to locate faults as shown in the graphic 812 and allow for building fault walls as shown in the graphic 822. The defined segments 824 can be rendered visually distinct through contrasting colors, shading, etc., such that a visual examination can readily assess quality. While not indicated in FIG. 8, the fault center lines 818 may be color coded or otherwise coded for purposes of quality control, alteration, etc. The fault walls 828 may be coded using color or other visual indicators. In general, a display scheme that emphasizes contrast between two adjacent segments can expedite review and alteration, if required or desired. Information such as fault lines and fault walls (or other information) may be coded and rendered to facilitate review and alteration, if required or desired. As described herein, one goal may be to construct a water tight structural framework as well as a pillar grid. In the example of FIG. 8, fault center lines may be rendered and hanging and fault wall polygons generated in manners that allow for quality control checks against variance calculations at the horizon level (e.g., as provided by rendered multicolor defined segments).

Figure 9:
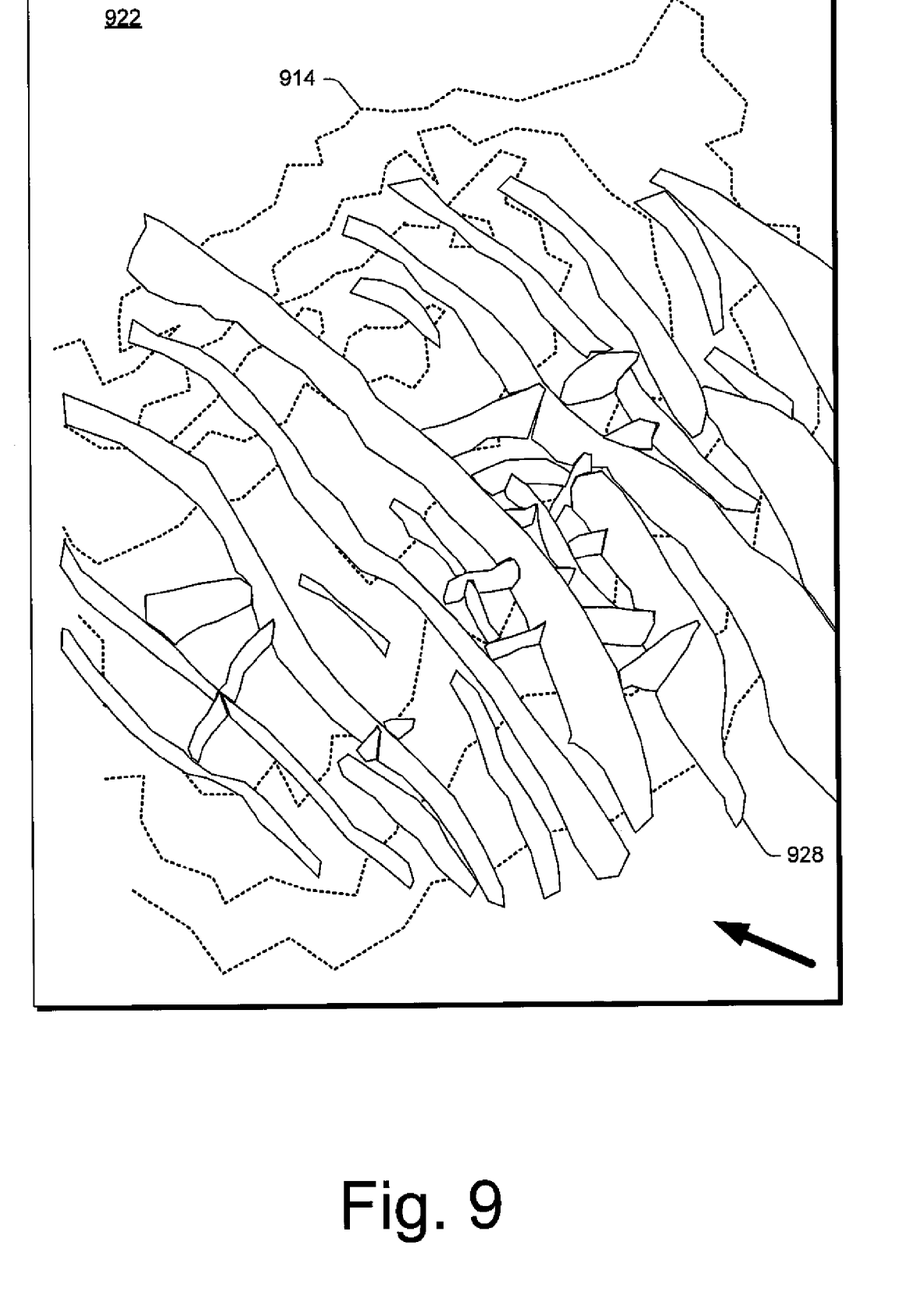
FIG. 9 illustrates an example of a graphical user interface.

FIG. 9 shows a graphic 922 of a geologic environment with a structural framework that includes a fault network and structural horizons. While the graphic 922 does not show the underlying defined segments, an option may exist to toggle the defined segments on and off as well as optionally adjust transparency. For example, a system may provide a user with an option to render the defined segments (see, e.g., the graphic 822 of FIG. 8) in the graphic 922 of FIG. 9.

As mentioned, such a framework may be built based at least in part on a segmentation process that includes performing geometrical calculations and defining segments based at least in part on such calculations. Given a framework, a pillar grid can be generated automatically, for example, in a zone of interest. As described herein, one or more segmentation attributes can be used to identify fault blocks. Such information may be used to make updates to a horizon- and/or fault-cut interpretation. Faults identified using a segmentation process may be represented as polygons (e.g., triangulated, etc.) and processed to include fault-fault relationships as part of a model of a geologic environment. As mentioned, a segmentation process that defines segments prior to model building can be used for quality control at any time during model building. While various examples described herein illustrate defined segments using hatching in black and white, colors may be assigned to defined blocks to enhance fault locating and quality control checking.

As described herein, one or more computer-readable media may include computer-executable instructions to instruct a computing system to output information for controlling a process. For example, such instructions may provide for output to sensing process, an injection process, drilling process, an extraction process, etc.

Figure 10:
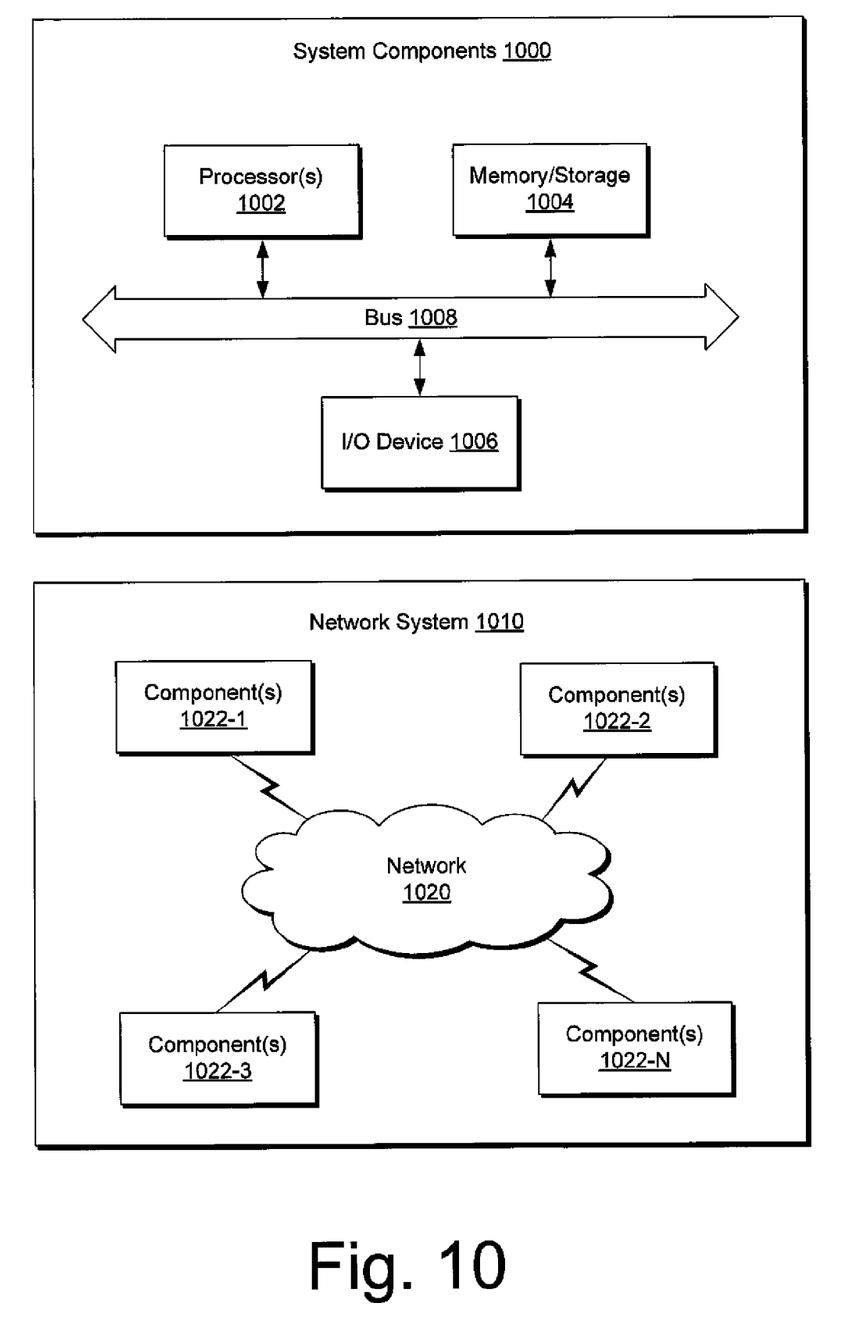
FIG. 10 illustrates example components of a system and a networked system.

FIG. 10 shows components of a computing system 1000 and a networked system 1010. The system 1000 includes one or more processors 1002, memory and/or storage components 1004, one or more input and/or output devices 1006 and a bus 1008. As described herein, instructions may be stored in one or more computer-readable media (e.g., memory/storage components 1004). Such instructions may be read by one or more processors (e.g., the processor(s) 1002) via a communication bus (e.g., the bus 1008), which may be wired or wireless. The one or more processors may execute such instructions to implement (wholly or in part) one or more attributes (e.g., as part of a method). A user may view output from and interact with a process via an I/O device (e.g., the device 1006). As described herein, a computer-readable medium may be a storage component such as a physical memory storage device, for example, a chip, a chip on a package, a memory card, etc.

As described herein, components may be distributed, such as in the network system 1010. The network system 1010 includes components 1022-1, 1022-2, 1022-3, . . . 1022-N. For example, the components 1022-1 may include the processor(s) 1002 while the component(s) 1022-3 may include memory accessible by the processor(s) 1002. Further, the component(s) 1002-2 may include an I/O device for display and optionally interaction with a method. The network may be or include the Internet, an intranet, a cellular network, a satellite network, etc.

Conclusion

Although various methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

The invention claimed is:

1. One or more non-transitory computer-readable media comprising computer-executable instructions to instruct a computing system to:
   perform geometrical calculations using seismic horizon data acquired via sensors in a geologic environment;
   define horizon segments based on the geometrical calculations wherein each defined horizon segment comprises points and wherein each point has a corresponding probability of that point belonging to a defined horizon segment in the geologic environment; and
   render a map of at least some of the probabilities to a display to assess quality of at least a portion of the defined horizon segments of the geologic environment.

2. The one or more non-transitory computer-readable media of claim 1 further comprising computer-executable instructions to instruct a computing system to map the defined horizon segments.

3. The one or more non-transitory computer-readable media of claim 1 further comprising computer-executable instructions to instruct a computing system to alter a probability for a point based on user input.

4. The one or more non-transitory computer-readable media of claim 1 further comprising computer-executable instructions to instruct a computing system to alter a boundary of a defined horizon segment based on user input.

5. The one or more non-transitory computer-readable media of claim 1 further comprising computer-executable instructions to instruct a computing system to access seismic horizon data wherein the data comprises seismic time data or seismic depth data.

6. The one or more non-transitory computer-readable media of claim 1 wherein the computer-executable instructions to instruct a computing system to perform geometrical calculations comprise instructions to instruct a computing system to perform geometrical calculations based at least in part on a connection distance.

7. The one or more non-transitory computer-readable media of claim 1 wherein the computer-executable instructions to instruct a computing system to perform geometrical calculations comprise instructions to instruct a computing system to perform geometrical calculations based at least in part on geometric isolation.

8. The one or more non-transitory computer-readable media of claim 1 wherein the computer-executable instructions to instruct a computing system to perform geometrical calculations comprise instructions to instruct a computing system to calculate probabilities based at least in part on segment-to-segment connectivity.

9. The one or more non-transitory computer-readable media of claim 1 wherein the computer-executable instructions to instruct a computing system to perform geometrical calculations comprise instructions to instruct a computing system to calculate probabilities based at least in part on spillage.

10. The one or more non-transitory computer-readable media of claim 9 wherein spillage comprises throw of a fault.

11. A method comprising:
receiving seismic horizon data that represents a seismic horizon of a geologic environment;
performing point-based geometrical calculations using the seismic horizon data to determine classification attribute values;
defining horizon segments of the seismic horizon based at least in part on the classification attribute values; and
rendering the defined horizon segments of the seismic horizon via a computing system wherein the rendering comprises assigning each of the defined horizon segments a particular color selected from a multicolor scheme to assess quality of at least a portion of the defined horizon segments of the geologic environment.

12. The method of claim 11 wherein the performing geometrical calculations comprises determining distances between points.

13. The method of claim 11 wherein the defining comprises defining horizon segments based on connectedness of points.

14. The method of claim 11 wherein the classification attribute values comprise values of an attribute selected from a group consisting of a segment classification attribute and a classification probability attribute.

15. One or more non-transitory computer-readable media comprising computer-executable instructions to instruct a computing system to:
render defined segments to a display wherein the defined segments represent fault blocks of a geologic environment;
render probability information to the display wherein the probability information corresponds to points associated with seismic data acquired from the geologic environment; and
alter a boundary of a segment based at least in part on rendered probability information to enhance quality of at least the segment of the geologic environment.

16. The one or more non-transitory computer-readable media of claim 15 wherein the computer-executable instructions to instruct a computing system to render defined segments comprises instructions to instruct a computing system to render the defined segments according to a multicolor scheme.

17. The one or more non-transitory computer-readable media of claim 15 wherein the computer-executable instructions to instruct a computing system to render probability information comprises instructions to render probability information over a segment.

18. The one or more non-transitory computer-readable media of claim 15 further comprising computer-executable instructions to instruct a computing system to confirm an altered boundary.

19. The one or more non-transitory computer-readable media of claim 15 further comprising computer-executable instructions to instruct a computing system to build a framework for modeling the geologic environment based on the defined segments.

20. A system comprising:
a processor;
memory operatively coupled to the processor; and
one or more modules stored in the memory that comprises processor-executable instructions wherein the instructions comprise instruction to instruct the system to
perform geometrical calculations using seismic horizon data acquired via sensors in a geologic environment;
define horizon segments based on the geometrical calculations wherein each defined horizon segment comprises points and wherein each point has a corresponding probability of that point belonging to a defined horizon segment in the geologic environment; and
render a map of at least some of the probabilities to a display to assess quality of at least a portion of the defined horizon segments of the geologic environment.

21. A system comprising:
a processor;
memory operatively coupled to the processor; and
one or more modules stored in the memory that comprises processor-executable instructions wherein the instructions comprise instruction to instruct the system to
receive seismic horizon data that represents a seismic horizon of a geologic environment;
perform point-based geometrical calculations using the seismic horizon data to determine classification attribute values;
define horizon segments of the seismic horizon based at least in part on the classification attribute values; and
render the defined horizon segments of the seismic horizon to a display wherein each of the defined horizon segments is assigned a particular color selected from a multicolor scheme to assess quality of at least a portion of the defined horizon segments of the geologic environment.

22. A system comprising:
a processor;
memory operatively coupled to the processor; and
one or more modules stored in the memory that comprises processor-executable instructions wherein the instructions comprise instruction to instruct the system to
render defined segments to a display wherein the defined segments represent fault blocks of a geologic environment;
render probability information to the display wherein the probability information corresponds to points associated with seismic data acquired from the geologic environment; and
alter a boundary of a segment based at least in part on rendered probability information to enhance quality of at least the segment of the geologic environment.

* * * * *